April 7, 1936.    F. D. CAMPBELL    2,036,681
EXTRUSION OF COOKED PLASTIC MATERIAL
Filed Nov. 14, 1931    6 Sheets-Sheet 6
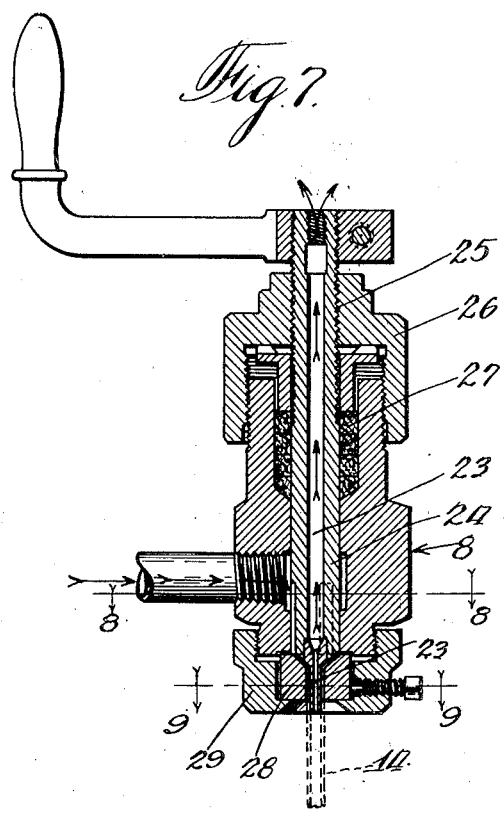
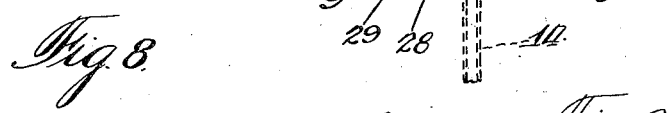
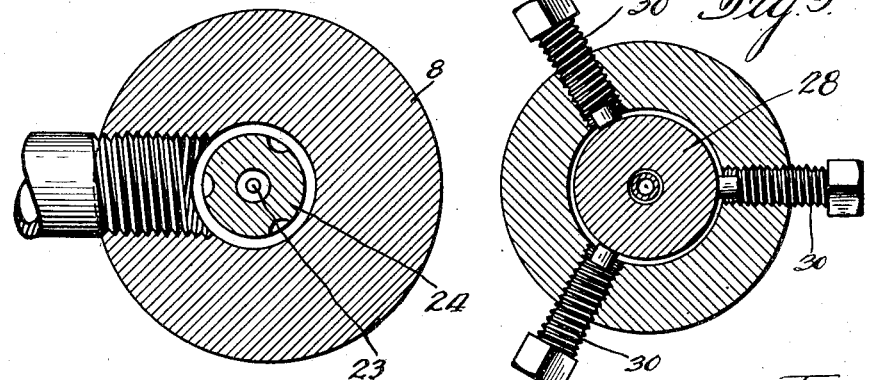

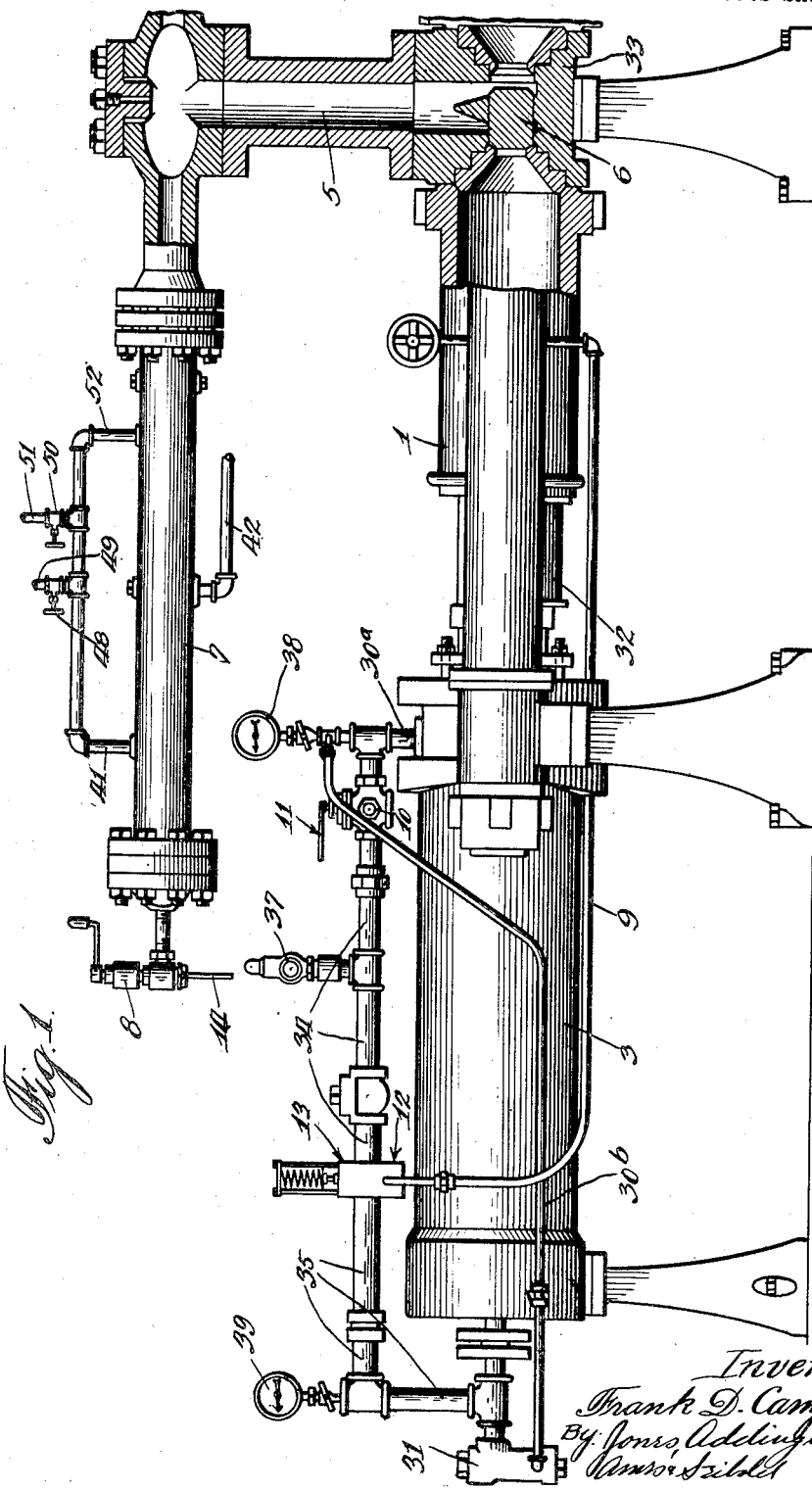

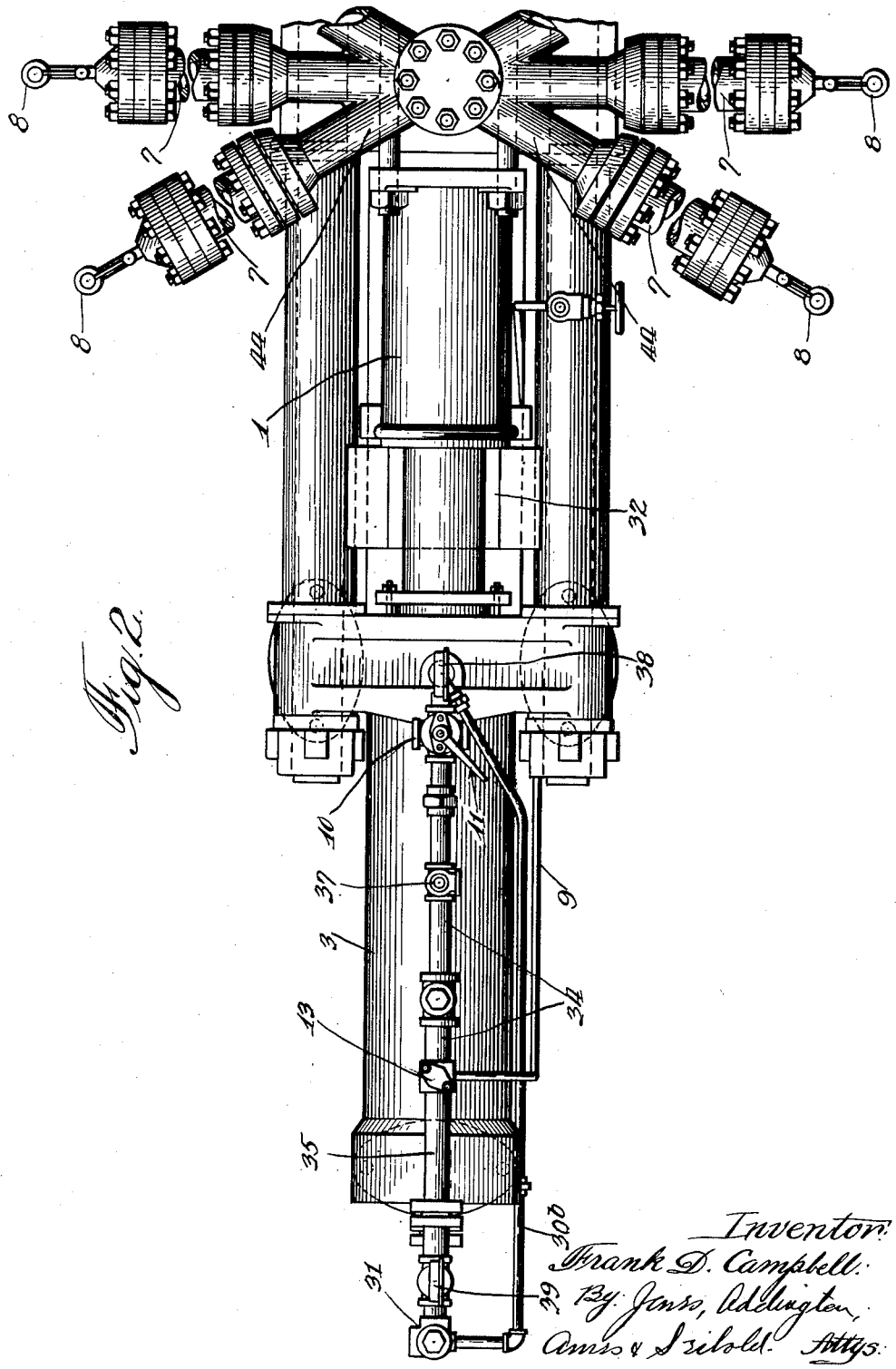

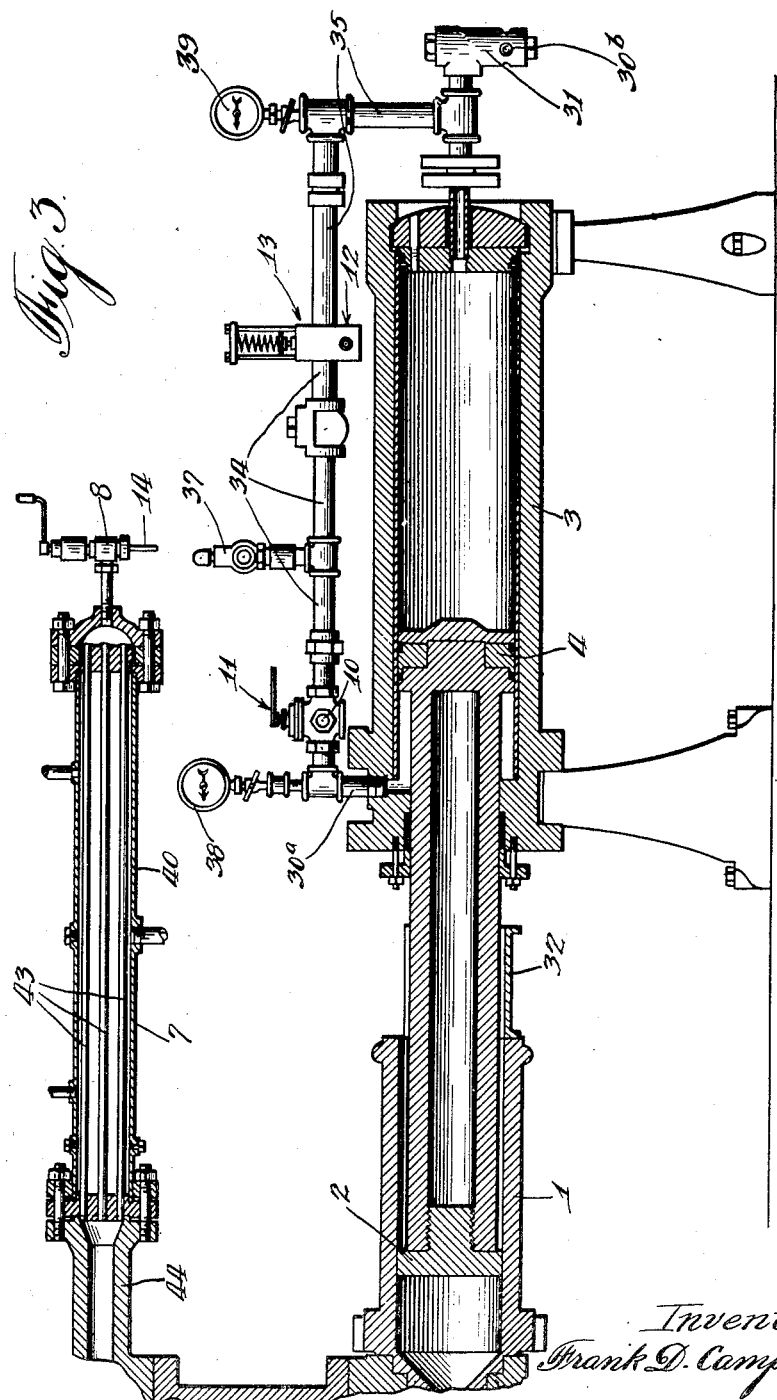

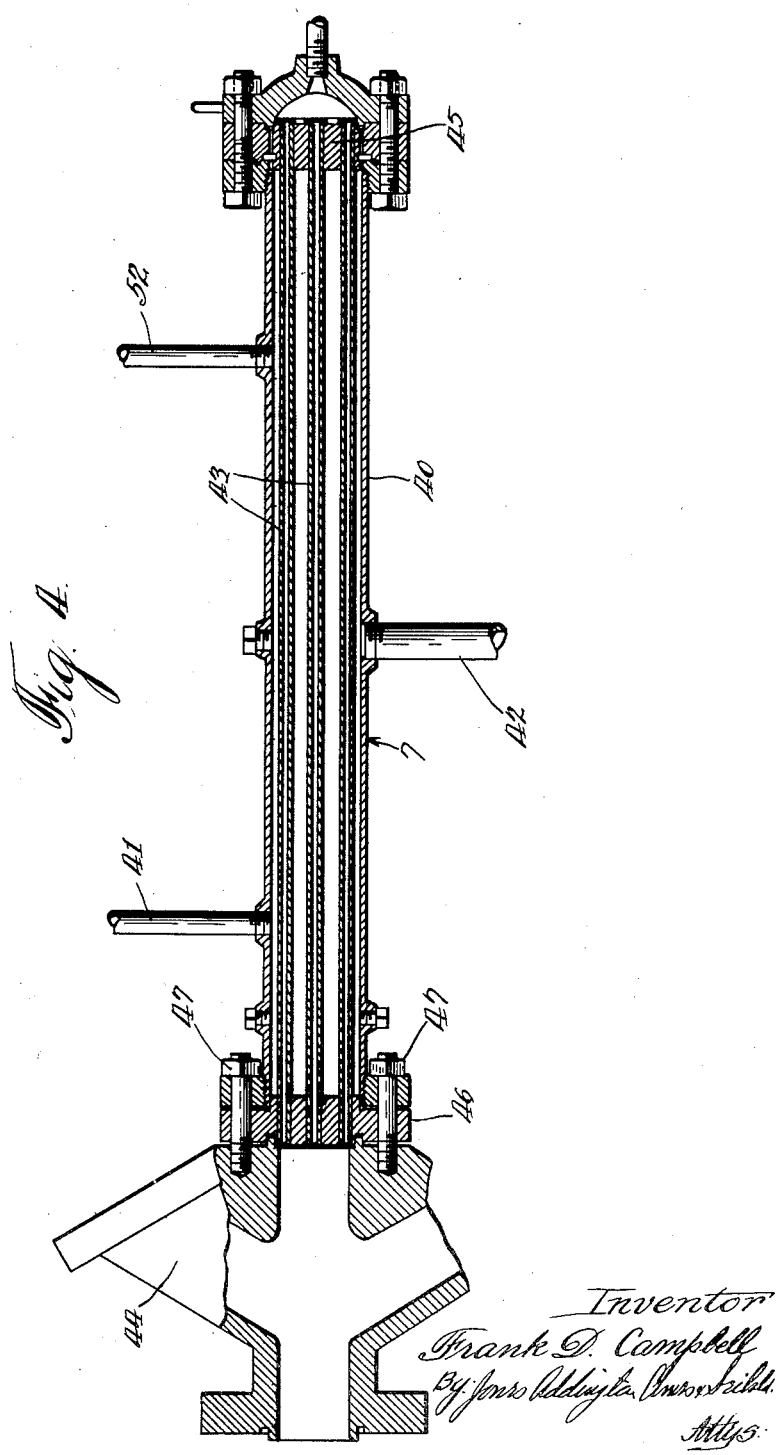

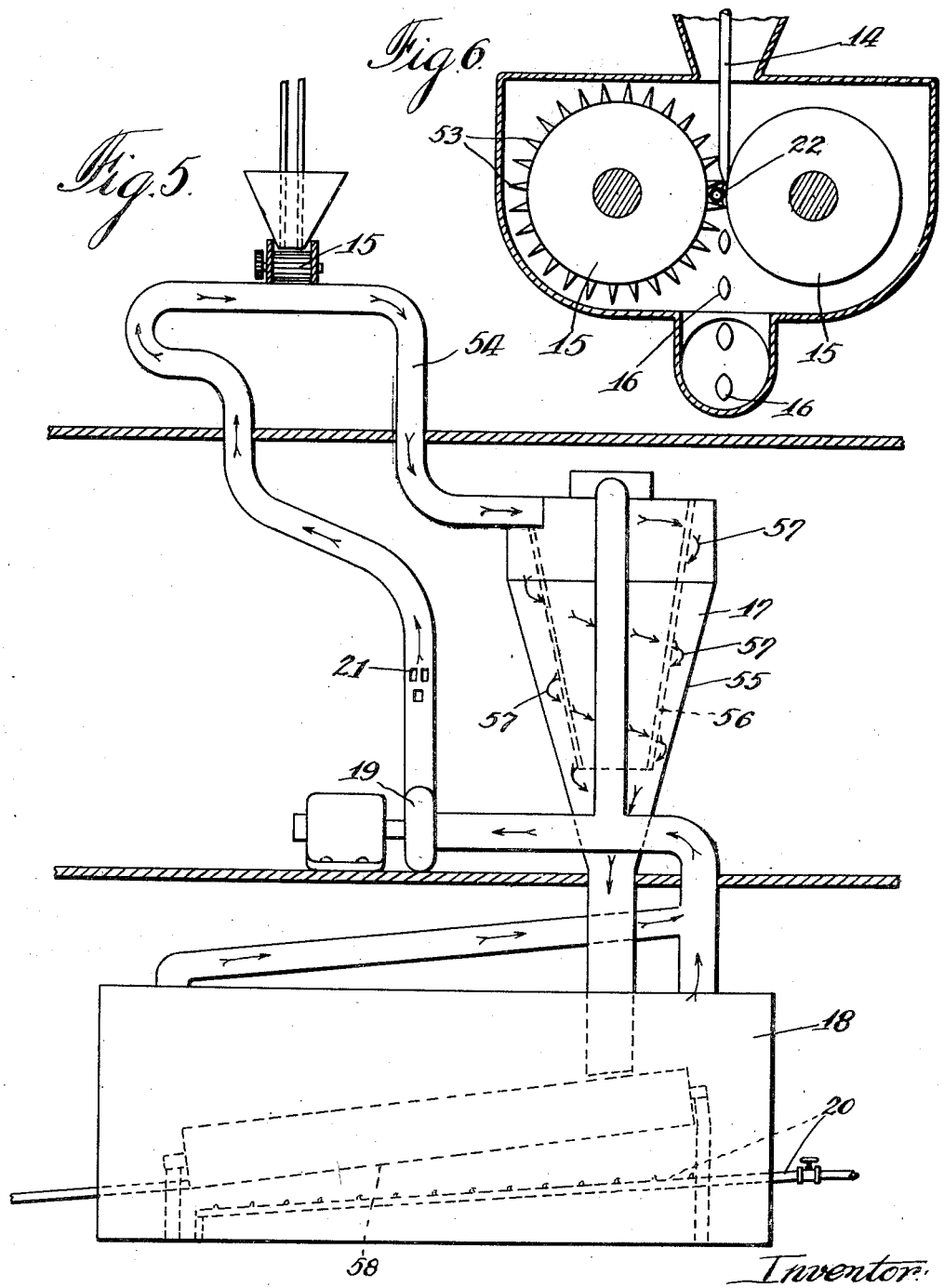

Patented Apr. 7, 1936

2,036,681

UNITED STATES PATENT OFFICE 2,036,681

EXTRUSION OF COOKED PLASTIC MATERIAL

Frank D. Campbell, Cedar Rapids, Iowa, assignor to The Quaker Oats Company, Chicago, Ill., a corporation of New Jersey Application November 14, 1931, Serial No. 575,086

3 Claims. (Cl. 99—237)

My invention relates to the extrusion of cooked plastic material.

One of the objects of my invention is to provide improved apparatus for extruding a tube of plastic material subject to internal pressure, having provisions for preventing the internal pressure from rupturing the tube or causing it to swell too much.

A further object is to provide an extrusion nozzle having provisions whereby it may be made adjustable to vary the flow of plastic material and to facilitate the flow of material in case it becomes clogged.

A further object is to provide a continuous flow extrusion apparatus fed from a plurality of extrusion cylinders.

A further object is to provide improved means for freeing cut hollow bodies from the cutting rolls.

A further object is to provide emergency apparatus for preventing the cooked material from burning in case the flow is temporarily interrupted.

A still further object is to provide an improved organization for extruding, cooking and toasting plastic material.

In the drawings, in which an embodiment of my invention is shown:

Figure 1 is a side elevational view of the central and left hand portions of the apparatus, parts being broken away;

Fig. 2 is a plan view;

Fig. 3 is a vertical axial sectional view through the right hand portion of the apparatus;

Fig. 4 is a horizontal sectional view through a cooking cylinder;

Fig. 5 is a diagrammatic elevational view showing the relative arrangement of cutting apparatus, drier and toaster;

Fig. 6 is a transverse sectional view of the cutting apparatus;

Fig. 7 is a vertical axial section of the extrusion nozzle;

Fig. 8 is a section on the line 8—8 of Fig. 7; and

Fig. 9 is a section on the line 9—9 of Fig. 7.

Referring now to the drawings in detail, the construction shown comprises a pair of oppositely disposed extrusion cylinders 1, a pair of extruding pistons 2 for said cylinders respectively, a pair of power cylinders 3 and pistons 4 for operating said extruding pistons 2, a common discharge passage 5 for said extrusion cylinders, an automatic slidable shuttle valve 6 controlled by the pressure of the extruded material for control communication between the extrusion cylinders 1 and the common discharge passage 5, a plurality of cooking cylinders 7 (6 being shown) to which the plastic material is supplied from said discharge passage, and one or more extrusion nozzles 8 for each cooking cylinder. Means are provided for controlling each of the power pistons comprising a source 9 of high pressure fluid, a source 10 of low pressure fluid, a four-way valve 11 for controlling the low pressure supply for alternating and subjecting opposite sides of the power pistons 4 to low pressure and exhaust, a high pressure valve 12 for subjecting one side of the piston to high pressure for the power stroke, and low pressure means 13 for controlling said high pressure valve.

The extrusion nozzles 8 are designed to extrude the cooked plastic food material in the form of a plastic tube 14 as shown in Fig. 7.

From the extrusion nozzles, the extruded tubular doughy material passes downwardly to a pair of cutting rolls 15 (Figs. 5 and 6) which cut the tube into sections and close the ends of the sections, thus forming closed hollow bodies 16 of plastic material. From the cutting rolls 15, the hollow bodies pass to a cyclone drier 17 which may be located on the floor below that on which the cutting apparatus is located, as shown in Fig. 5. The air in the passage to which the hollow bodies are delivered from the cutter is heated, causing the gaseous material such as air or steam enclosed in the hollow bodies to expand, thus inflating the hollow bodies and causing them to set in inflated condition, as indicated in Fig. 6.

From the cyclone drier 17 the dried, set hollow bodies are delivered to a toaster 18 which may be located on the floor below that on which the cyclone drier is located, as shown in Fig. 5.

A continuous circulation of heated air may be provided from the toaster 18 up to the cutting rolls 15, from the cutting rolls to the cyclone drier 17 and from the cyclone drier back to the toaster 18. Circulation of air may be effected in any suitable manner as by means of a motor driven rotary blower 19. The toaster may be heated in any suitable manner as by means of a gas heating apparatus 20. Additional heat may be supplied to the air in the passage from the toaster to the cutting apparatus by means of heating apparatus 21 located in the pipe above the blower.

In order to insure that the cut sections of cooked material shall be freed from the cutting rolls, a compressed air nozzle 22 is provided for delivering a jet of air longitudinally of the axis of the cutting rolls as indicated in Fig. 6.

In order to prevent the tube of extruded material from rupturing, due to the formation of steam within the tube on being released from the extrusion nozzle, an air vent 23 is provided as shown in Fig. 7 through the central core 24 of the extrusion nozzle 8. This vent reduces pressure in the tube 14 below the rupture point, although sufficient pressure is developed to cause a slight expansion of the tube on leaving the nozzle. This central core 24 is made axially adjustable in order to enable the flow of plastic material to be varied and to facilitate the flow of material in case it becomes clogged. This axial adjustment is effected by providing a screw threaded connection 25 between the upper end of the core and the retaining nut 26 for the packing gland 27.

To enable the ring portion 28 of the extrusion nozzle to be accurately centered with respect to the core portion 24, it is made laterally shiftable in a retaining nut 29 threaded on the lower end of the nozzle. Lateral adjustment of the ring in any direction may be effected by the use of the three adjusting screws 30 shown in Figs. 7 and 8.

Before describing in further detail the various parts of the apparatus, I will briefly outline the operation.

Referring first to Figs. 1 and 3 which, taken together, show the central, right and left-hand portions of the apparatus, assume that the left-hand extrusion piston and power piston are withdrawn to their extreme left-hand position and that the left-hand extrusion cylinder has been filled and packed with dough ready to be extruded. Assume also that the right-hand extrusion piston 2 and power piston 4 (shown in Fig. 3) have been driven to their extreme left-hand position, thus causing all of the dough in the left-hand extrusion cylinder to be expelled into the discharge passage 5. The attendant must now start the left-hand extrusion cylinder to extruding dough and must cause the right-hand extrusion piston to move to the right to permit the right-hand extrusion cylinder to be loaded with dough. In order to accomplish this, the attendant operates the right-hand four-way valve 11 to supply low pressure oil to the left-hand side of the power piston 4 through the pipe 30a and to supply low pressure oil through the pipe 30b to operate the exhaust valve 31 to permit the oil in the power cylinder 3 on the right-hand side of the power piston 4 to be exhausted as the low pressure oil on the left-hand side of the piston forces this piston to the right. The release of the pressure by the exhaust valve 31 automatically causes the valve construction 12 and 13 to close, cutting off high pressure from the right-hand side of the cylinder. The power piston and extrusion piston are thus caused to move rapidly to their extreme right-hand positions, withdrawing the extrusion piston to a position adjacent the right-hand end of the dough-receiving trough 32 used in loading the extrusion cylinder.

As the attendant has already moved the left-hand valve 11 to a position in which it is ready to insure movement of the left-hand piston 2 in a direction to force dough into the common discharge passage 5, this left-hand piston 2 will start feeding dough as soon as feeding pressure on the right-hand piston 2 ceases. At this time, the shuttle valve 6 is automatically shifted by pressure to cut off the right-hand extrusion cylinder from the common discharge passage 5 and to open communication between the left-hand extrusion cylinder and the passage 5. This shifting of the valve 6 takes place because of the relieving of the pressure on the right-hand side of the valve 6 and the application of pressure on the left-hand side of the valve. The valve is of cylindrical form and is slidably mounted in a cylindrical bore in the valve casing 33 to which the extrusion cylinders 1 are connected. The action of the apparatus by which the extruding action of the extruding piston is controlled will be described more in detail hereinafter in connection with the right-hand extrusion apparatus shown in Fig. 3.

I will now refer again to Fig. 3, in which I have followed the operation of the extruding piston up to the time at which it has been moved to a position adjacent the right-hand end of the dough trough 32. With the extrusion piston in this position, the attendant places chunks of dough, supplied in any suitable manner, in the loading trough until a load of suitable size has been attained. He then operates the valve 11 to cause low pressure to be applied to the right-hand side of the power piston 4, forcing the load in the dough trough into the extrusion cylinder. A portion of dough is thus packed into the extreme left-hand portion of the extrusion cylinder under low pressure. The attendant then operates the valve 11 to cause the extrusion piston 2 to be again withdrawn to its extreme right-hand position. The attendant then again loads the trough with dough and repeats the operation of forcing this load of dough into the extrusion cylinder. This process is repeated until the extrusion cylinder is substantially full of dough, packed therein under low pressure.

As soon as the right-hand cylinder has been loaded with dough, the attendant operates the right-hand valve 11 to apply high pressure to the right-hand side of the power piston 4 and to place the left-hand side of the power piston 4 in communication with the exhaust. Both power pistons are now subject to high pressure and as the pressures on the two pistons balance each other, the shuttle valve 6 remains stationary, leaving the left-hand extrusion cylinder 1 in communication with the discharge passage 5.

During the time in which the right-hand cylinder is being loaded, the left-hand extrusion piston is forcing the dough in the left-hand extrusion cylinder into the discharge passage 5 through the cookers 7 and out through the nozzles 8. As soon as the left-hand extrusion piston has emptied the left-hand extrusion cylinder of dough, the left-hand valve 11 is operated to cause withdrawal of the left-hand extrusion piston to its extreme left-hand position so that a load of dough may be placed in the left-hand dough trough 32. The left-hand cylinder is then loaded with dough in the same manner as previously described in connection with the right-hand dough cylinder.

The operation of the left-hand valve 11 to relieve pressure on the left-hand power piston unbalances the pressure on the shuttle valve 6, causing the shuttle valve 6 to be forced to the left by the pressure in the right-hand extrusion cylinder, thus permitting the high pressure feeding operation of the right-hand extrusion piston 2.

The pressure controlled and controlling apparatus used in connection with the operation of the power pistons 4 may be of any usual or suitable construction for accomplishing the purposes desired. The valve construction 12 and 13 is controlled in its opening movement by low pressure oil from the four-way valve 11 through the pipes 34 to control communication between the high pressure line 9 and the pipes 35 leading to the pressure side of the power cylinder 3. The exhaust valve 31 is controlled by low pressure oil from the four-way valve 11 through the pipe 30b to open or close the valve 31 for controlling the exhaust from the power cylinder. The valve construction 12 and 13 is controlled in its closing movement by the action of the exhaust valve 31, which, when opened to permit the exhaust of oil from the power cylinder, changes the pressure in a way to cause the valve construction 12 and 13 to cut off communication between the power cylinder and high pressure oil.

A suitable safety valve 37 is provided for the low pressure line, and suitable pressure indicators 38 and 39 are provided for the low pressure and high pressure lines, respectively. The working pressure for the low pressure line may be about 225 pounds per square inch, and the working pressure for the high pressure line may be about 4,000 pounds per square inch. This will give a pressure on the dough in the pressure cylinders of about 5,600 pounds per square inch.

The cooker construction, shown in section in Figs. 3 and 4, comprises a steam chamber 40 having a steam inlet 41 and outlet 42 and a plurality of dough tubes 43 leading from one end to the other of the steam chamber through which the dough is forced from the branched header member 44 with which the passage 5 communicates.

The ends of the dough tubes are seated in the header plates 45 and 46 which are so constructed that the entire nest of tubes and header plates may be removed as a unit from the steam chamber for purposes of cleaning or repairing. To enable this to be accomplished, the right-hand header plate 45 is made slightly smaller in diameter than the internal diameter of the steam chamber 40 so that by removing the nuts 47 and disconnecting the cooker from the header, the entire nest of dough tubes 43 may be slipped out of the steam chamber 40 by moving the nest of tubes to the left (Fig. 4).

In order to enable the attendant to prevent the dough in the dough tubes from getting burnt in case the flow of dough is temporarily suspended, means are provided for cutting off the supply of steam to the steam chamber and for admitting a supply of cold water thereto comprising a valve 48 for controlling the steam supply pipe 49 and the valve 50 for controlling the water supply pipe 51 leading to the inlet pipe 52 for the steam chamber.

From the extrusion nozzles 8, the tubes of dough 14 pass downwardly to the cutting rolls 15 where they are pinched into sections by the cutting blades 53. The cutting blades 53 also pinch together and seal the ends of the sections, thus forming closed, hollow bodies 16 containing vapor or steam. From the cutting rolls the hollow dough sections pass to the duct 54 leading to the cyclone drier. The air in this passage is heated to about 350° Fahrenheit, causing the steam or vapor in the hollow dough section to expand, thus inflating them and causing them to set in an inflated condition.

From the cyclone drier 17, the hollow globular sections are delivered to the toaster 18 where they are subjected to a temperature of about 350° Fahrenheit for about twelve minutes. The toasted sections are delivered from the left-hand end of the toaster in condition ready for packaging.

The cyclone drier 17 may be of any usual or suitable construction, as shown comprising a funnel-shaped outer shell 55 and a funnel-shaped inner shell 56 providing an annular conical space down which the tube sections are carried in a spiral path, as indicated by the arrows 57.

The toaster may be of any usual or suitable construction comprising an inclined hollow rotatable cylinder 58 to the interior of which the globular sections are delivered from the cyclone drier 17, the sections gradually moving down the inclined cylinder as it rotates and being finally delivered at the left-hand end of the toaster.

Further modifications will be apparent to those skilled in the art and I desire, therefore, to be limited only by the prior art and the scope of the appended claims.

Having thus described my invention, what I claim and desire to secure by Letters Patent is:

1. Apparatus for cooking and extruding plastic material, comprising a plurality of extrusion cylinders, a plurality of extruding pistons for said cylinders respectively, a plurality of power cylinders and pistons for operating said extruding pistons, a common discharge passage for said extrusion cylinders, an automatic valve controlled by the pressure of the extruded material for controlling communication between the extrusion cylinders and the discharge passage, a cooker to which the plastic material is supplied from said extrusion cylinders, an extrusion nozzle for the cooker, and means for controlling the power pistons comprising a source of high pressure fluid, a source of low pressure fluid, a four-way valve for controlling the low pressure supply for alternately subjecting opposite sides of the power piston to low pressure and exhaust, a high pressure valve for subjecting one side of the piston to high pressure for the power stroke, and low pressure control means for opening said high pressure valve.

2. Apparatus for cooking and extruding plastic material comprising an extrusion cylinder, a piston for said cylinder, a power cylinder and piston for operating said extrusion piston, a cooker to which the plastic material is supplied from said extrusion cylinder, and means for controlling the power piston comprising a source of high pressure fluid, a source of low pressure fluid, a four-way valve for controlling the low pressure supply for alternately subjecting opposite sides of the power piston to low pressure and exhaust, a high pressure valve for subjecting one side of the piston to high pressure for the power stroke, and low pressure control means for opening said high pressure valve.

3. Apparatus for cooking and extruding plastic food material comprising a plurality of extrusion cylinders lying substantially in a common horizontal plane, a common header into which said extrusion cylinders discharge, valve means for controlling communication between the extrusion cylinders and said header, and a plurality of elongated cookers in communication with said header and radiating therefrom and lying substantially in a common horizontal plane.

FRANK D. CAMPBELL.